(12) United States Patent
Kim et al.

(10) Patent No.: US 11,599,622 B2
(45) Date of Patent: Mar. 7, 2023

(54) SYSTEM FOR RESOURCE MONITORING AND TRANSMITTING ELECTRONIC ALERTS USING EVENT-BASED TRIGGERS

(71) Applicant: Bank of America Corporation, Charlotte, NC (US)

(72) Inventors: Andrew DongHo Kim, Glendale, AZ (US); Enrique L. Valdez, Phoenix, AZ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 261 days.

(21) Appl. No.: 16/907,404

(22) Filed: Jun. 22, 2020

(65) Prior Publication Data

US 2020/0401689 A1 Dec. 24, 2020

Related U.S. Application Data

(60) Provisional application No. 62/864,874, filed on Jun. 21, 2019.

(51) Int. Cl.
*G06F 21/44* (2013.01)
*G06F 11/34* (2006.01)
*G06F 9/50* (2006.01)
*G06F 9/54* (2006.01)
*H04L 67/306* (2022.01)

(52) U.S. Cl.
CPC ............ *G06F 21/44* (2013.01); *G06F 9/5005* (2013.01); *G06F 9/542* (2013.01); *G06F 11/3409* (2013.01); *H04L 67/306* (2013.01); *G06F 2201/86* (2013.01)

(58) Field of Classification Search
CPC . G06F 21/44; G06F 11/34; G06F 9/50; G06F 9/54; H04L 29/08
See application file for complete search history.

(56) References Cited

U.S. PATENT DOCUMENTS

| | | | |
|---|---|---|---|
| 7,355,996 B2 | 4/2008 | Hrastar | |
| 7,426,654 B2 | 9/2008 | Adams, Jr. et al. | |
| 7,930,681 B2 | 4/2011 | Kloeffer et al. | |
| 7,958,268 B2 | 6/2011 | Redlich et al. | |
| 8,018,332 B2 | 9/2011 | Boling et al. | |
| 8,745,191 B2 | 6/2014 | Raleigh et al. | |
| 8,825,508 B2 | 9/2014 | Nilsson | |
| 10,237,280 B2 | 3/2019 | Day, II et al. | |
| 10,278,049 B2 | 4/2019 | Abu-Hakima et al. | |
| 10,423,309 B2 | 9/2019 | Kitchen et al. | |
| 10,516,531 B2 | 12/2019 | Schutz et al. | |
| 10,558,800 B2 | 2/2020 | Ray et al. | |
| 10,652,164 B2 | 5/2020 | Garcia et al. | |

(Continued)

*Primary Examiner* — Charles E Anya (74) *Attorney, Agent, or Firm* — Moore & Van Allen PLLC; Seongun M. Hong (57) ABSTRACT

A system provides resource monitoring and transmitting electronic alerts using event-based triggers. The system may determine, based on a user's identity, that the user requires additional security and monitoring products and/or services with respect to the user's account. In this regard, the system may continuously monitor the user's activity (e.g., to monitor a resource associated with the user account). The system may further define user events which may trigger the transmission of electronic alerts sent to computing devices of the user and/or third parties associated with the user.

12 Claims, 2 Drawing Sheets

(56) References Cited

U.S. PATENT DOCUMENTS

| | | | |
|---|---|---|---|
| 10,673,902 B2 | 6/2020 | Thomas et al. | |
| 11,037,160 B1* | 6/2021 | Kolls | G06Q 20/4016 |
| 11,184,392 B2* | 11/2021 | Thomas | H04L 63/0209 |
| 11,288,359 B1* | 3/2022 | Caldwell | G06F 21/45 |
| 2005/0188080 A1 | 8/2005 | Motsinger et al. | |
| 2005/0188221 A1 | 8/2005 | Motsinger et al. | |
| 2007/0143827 A1 | 6/2007 | Nicodemus et al. | |
| 2012/0036452 A1* | 2/2012 | Coleman | G06F 21/55 715/751 |
| 2015/0020162 A1* | 1/2015 | Hefetz | G06Q 20/4016 726/3 |
| 2017/0286671 A1* | 10/2017 | Chari | G06F 21/552 |
| 2017/0300911 A1* | 10/2017 | Alnajem | G06Q 20/4015 |
| 2018/0041595 A1* | 2/2018 | Dintenfass | H04L 51/24 |
| 2018/0197387 A1 | 7/2018 | Dawes | |
| 2018/0276962 A1 | 9/2018 | Butler et al. | |
| 2020/0133698 A1 | 4/2020 | Permenter et al. | |

* cited by examiner

SYSTEM FOR RESOURCE MONITORING AND TRANSMITTING ELECTRONIC ALERTS USING EVENT-BASED TRIGGERS

PRIORITY CLAIM

This application claims priority to U.S. Provisional Application Ser. No. 62/864,874, entitled "SYSTEM FOR RESOURCE MONITORING AND TRANSMITTING ELECTRONIC ALERTS USING EVENT-BASED TRIGGERS", filed Jun. 21, 2019, which is incorporated herein by reference in its entirety.

FIELD OF THE INVENTION

The present disclosure embraces a system for resource monitoring and transmitting electronic alerts using event-based triggers.

BACKGROUND

There is a need for an efficient way to transmit time-sensitive information to users and/or third parties regarding via alerts related to the user's account resources.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The present disclosure is directed to a system for resource monitoring and transmitting electronic alerts using event-based triggers. The system may determine, based on a user's identity, that the user requires additional security and monitoring products and/or services with respect to the user's account. In this regard, the system may continuously monitor the user's activity (e.g., to monitor a resource associated with the user account). The system may further define user events which may trigger the transmission of electronic alerts sent to computing devices of the user and/or third parties associated with the user.

Accordingly, embodiments of the present disclosure provide a system for resource monitoring and transmitting electronic alerts using event-based triggers. The system may comprise a memory device with computer-readable program code stored thereon; a communication device; and a processing device operatively coupled to the memory device and the communication device. The processing device may be configured to execute the computer-readable program code to continuously monitor a user account in real time; detect a trigger event associated with the user account; transmit a first notification to a user device associated with the user account; and transmit a second notification to a third party device associated with the user account.

In some embodiments, continuously monitoring the user account in real time comprises at least one of monitoring devices used to access the user account and geographic location of the devices used to access the user account.

In some embodiments, the trigger event is an attempt to access the user account using an unknown device and unusual geographic location.

In some embodiments, the first notification comprises a resource transfer amount and location at which the resource transfer was attempted.

In some embodiments, the trigger event is a resource transfer request, wherein the computer-readable program code further causes the processing device to receive authorization of the resource transfer request from the user device; receive authorization of the resource transfer request from the third party device; and based on receiving the authorization of the resource transfer request from the user device and the third party device, process the resource transfer request.

In some embodiments, the trigger event is a resource transfer request, wherein the computer-readable program code further causes the processing device to receive authorization of the resource transfer request from the third party device; and based on receiving the authorization of the resource transfer request from the user device and the third party device, process the resource transfer request.

In some embodiments, the computer-readable program code further causes the processing device to detect a presence of a third party screen sharing application on the user device; and automatically block resource transfer requests associated with the user account.

Embodiments of the present disclosure also provide a computer program product for resource monitoring and transmitting electronic alerts using event-based triggers, the computer program product comprising at least one non-transitory computer readable medium having computer-readable program code portions embodied therein, the computer-readable program code portions comprising executable code portions for continuously monitoring a user account in real time; detecting a trigger event associated with the user account; transmitting a first notification to a user device associated with the user account; and transmitting a second notification to a third party device associated with the user account.

In some embodiments, continuously monitoring the user account in real time comprises at least one of monitoring devices used to access the user account and geographic location of the devices used to access the user account.

In some embodiments, the trigger event is an attempt to access the user account using an unknown device and unusual geographic location.

In some embodiments, the first notification comprises a resource transfer amount and location at which the resource transfer was attempted.

In some embodiments, the trigger event is a resource transfer request, wherein the computer-readable program code portions further comprise executable code portions for receive authorization of the resource transfer request from the user device; receive authorization of the resource transfer request from the third party device; and based on receiving the authorization of the resource transfer request from the user device and the third party device, process the resource transfer request.

In some embodiments, the trigger event is a resource transfer request, wherein the computer-readable program code portions further comprise executable code portions for receive authorization of the resource transfer request from the third party device; and based on receiving the authorization of the resource transfer request from the user device and the third party device, process the resource transfer request.

Embodiments of the present disclosure also provide a computer-implemented method for resource monitoring and transmitting electronic alerts using event-based triggers, the computer-implemented method comprising continuously monitoring a user account in real time; detecting a trigger event associated with the user account; transmitting a first notification to a user device associated with the user account; and transmitting a second notification to a third party device associated with the user account.

In some embodiments, continuously monitoring the user account in real time comprises at least one of monitoring devices used to access the user account and geographic location of the devices used to access the user account.

In some embodiments, the trigger event is an attempt to access the user account using an unknown device and unusual geographic location.

In some embodiments, the first notification comprises a resource transfer amount and location at which the resource transfer was attempted.

In some embodiments, the trigger event is a resource transfer request, wherein the computer-implemented method further comprises receive authorization of the resource transfer request from the user device; receive authorization of the resource transfer request from the third party device; and based on receiving the authorization of the resource transfer request from the user device and the third party device, process the resource transfer request.

In some embodiments, the trigger event is a resource transfer request, wherein the computer-implemented method further comprises receive authorization of the resource transfer request from the third party device; and based on receiving the authorization of the resource transfer request from the user device and the third party device, process the resource transfer request.

In some embodiments, the computer-implemented method further comprises detecting a presence of a third party screen sharing application on the user device; and automatically blocking resource transfer requests associated with the user account.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization, a non-profit organization, a government organization, and the like, which may routinely use various types of applications within its enterprise environment to accomplish its organizational objectives.

"Entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, as used herein the term "user device" or "mobile device" may refer to mobile phones, personal computing devices, tablet computers, wearable devices, and/or any portable electronic device capable of receiving and/or storing data therein.

"Resource" as used herein may refer to an object under the ownership of a user which is stored or maintained by the entity on the user's behalf. The resource may be intangible or tangible objects such as data files, documents, biographical data, funds, and the like. Typically, the user's account contains records of the resources owned by the user. Account data may be stored in an account database within the entity's systems.

Embodiments of the present disclosure provide a system for resource monitoring and transmitting electronic alerts using event-based triggers. The system may, in real-time, continuously monitor a resource associated with a user's account to detect the occurrence of certain events associated with the account. Upon the occurrence of the events, the system may use event-based triggers to transmit real-time notifications to the user and/or a third party associated with the user. In this way, the system may generate just-in-time alerts to prevent unintended or unauthorized use of the user's account resources.

Examples of events associated with the user's account may include unusual account activity (e.g., abnormally large resource transfers, attempts to access the account from an unknown device and/or unusual geographic location, unusual or flagged transaction target, or the like), changes in the user's status (e.g., the user's contact information, biographical information, or the like), unauthorized attempts by attackers to access the user's information (e.g., e-mail and/or phone spoofing, social engineering, or the like), or other types of definable events associated with the user's account.

As described above, upon the occurrence of such events, the system may generate real-time notifications to be sent to the user and/or third party. The notification may contain the details concerning the event which triggered the notification. For instance, if the event triggering the notification was an abnormally large resource transfer, the notification may contain the resource amount, the transferor/transferee information, the date and location at which the transfer was attempted, or the like. In some embodiments, the third party may be an entity or individual having a defined relationship with the user (e.g., a family member, caretaker, guardian, or other trusted individual).

An exemplary use case of the system described herein follows. The system, which may be owned and/or operated by an entity such as a financial institution, may monitor an account of a user who is vulnerable to unauthorized attacks. Accordingly, the system may flag the user based on a change in the user's status. In other embodiments, the system may be configured to allow a user to be flagged manually (e.g., by an employee or administrator of the entity) based on unusual account activity. In yet other embodiments, the user may opt in to additional account monitoring.

Continuing the example, the monitored user may attempt to make a transaction under the influence of an unauthorized user (e.g., the monitored user attempts to withdraw an unusual amount from the user's account, to purchase multiple gift cards, or the like), where the system has been configured to consider large withdrawals as a trigger event. Once the system detects that the event has been triggered, the system may transmit notifications to the user and/or a third party (e.g., a caretaker), where the notification references the trigger event as a potentially unauthorized or illegitimate activity. In some embodiments, the notification may comprise an active link which the user and/or third party may activate to confirm that the trigger event (e.g., the unusual and/or flagged transaction) was an intentional event. In other embodiments, the system may automatically transmit an alert to an employee or administrator of the entity who may manually review the trigger event. In some embodiments, the system may open a communication channel (e.g., a voice call, video teleconference session, or the like) between the employee and the user to discuss the potentially unauthorized activity. In such embodiments, the employee or administrator may be an individual who has been specialized and/or trained to speak to clients regarding unauthorized transactions.

In some embodiments, the system may use an artificial intelligence powered representative (e.g., an AI-powered virtual assistant) to initially communicate with the user and/or the third party. In such embodiments, the virtual assistant may notify the user and/or third party of the potentially unauthorized activity and receive preliminary information (e.g., the circumstances of the activity, authentication information, verification of account information, or the like) before transitioning the communication session to a trained employee of the entity.

In some embodiments, in addition to transmitting a notification to the user and the third party individual associated with the user, the system may additionally transmit a notification to third party organizations associated with the user. For instance, upon detecting unusual account activity for the user's account, the system may notify other third party organizations who may have a working relationship with the user (e.g., other financial institutions, insurance providers, or other service providers, or the like). Based on receiving such notifications, the third party organizations may make changes to their respective accounts associated with the user. For example, in response to receiving a notification regarding potential unauthorized activity (e.g., compromise of a user's account with the entity), a third party financial institution may restrict the availability of resources of the user account with the third party financial institution. In such embodiments, the third party organizations and/or the entity may use a consortium model for sharing user information in order to comply with regulatory requirements, such as requirements concerning the distribution of personally identifiable information ("PII").

In some embodiments, the system may provide informational resources (e.g., an article, webinar, audio/video recording, pop-up notification, or the like) to the user and/or third party associated with the user. For instance, the system may, upon detecting a point of contact with the user (e.g., user sign-in to an entity-run website or application, a user's visit to an office or facility of the entity, a teleconference with the user, or the like), the system may provide reminders and/or notifications containing educational materials with respect to potential trigger events and/or products or services provided by the entity. In this regard, the system may provide said informational resources via the channel through which the contact with the user occurs. For instance, if the user signs into an application, the application may provide the informational resources in a pop-up notification. On the other hand, if the user calls the entity via voice chat or telephone, the system may provide the informational resources in audio format. In an exemplary embodiment, the system may detect that a flagged user (e.g., a user who is more vulnerable to social engineering) has signed onto the entity's website. In response to detecting the sign-on of the user, the system may transmit a notification to the user which contains information regarding common methods which unauthorized parties may use to improperly gain access to the user's account. In some embodiments, the virtual assistant may proactively transmit notifications containing informational resources to the user to provide training and/or education to the user. In some embodiments, the system may further be configured to track the user's activity on third party platforms and provide informational resources related to the user's activity. For instance, if the user submits a search engine query for certain products or services, the system may be configured to provide informational resources related to the user's search engine query upon detecting a user login.

In embodiments in which the trigger event is a type of transaction typically associated with unauthorized activity (e.g., the purchase of multiple gift cards), the system may be configured to log granular data and metadata with respect to such transactions. For instance, gift card transactions may be assigned unique coding such that the system may be able to readily identify the transaction as involving gift cards, which in turn aids the system in detecting that the activity is potentially unauthorized. The system may further implement phone-porting and/or phone-spoofing protection. In this regard, an entity may exchange call data associated with the user with third party service providers (e.g., wireless or wired phone service providers) to better identify when genuine calls originate from the user and when unauthorized porting or spoofing has occurred.

In some embodiments, the system may use a dual-factor authorization scheme in response to detecting trigger events. For instance, in some embodiments, the system may transmit notifications to both the user and an authorized third party (e.g., a client and a caretaker of the client) if a trigger event is detected. In such embodiments, the system may require that the third party either additionally or exclusively provides authorization of flagged transactions before the transaction is processed.

The system may further provide countermeasures to account takeover attempts. For instance, the system may be configured to detect the presence of third party screen sharing applications and/or remote access applications on the user's computing system when said computing system accesses the entity system. Upon detecting such applications, the system may automatically block transactions involving the user's account. In some embodiments, the system may additionally be configured to accept distress signals from users when the user is being coerced to perform certain actions within the entity system (e.g., the user is under duress). In this regard, the distress signal may be, for instance, a hidden PIN or other authentication credential which may signal to the entity that the user is under the influence of malicious or unauthorized parties.

Figure 1:
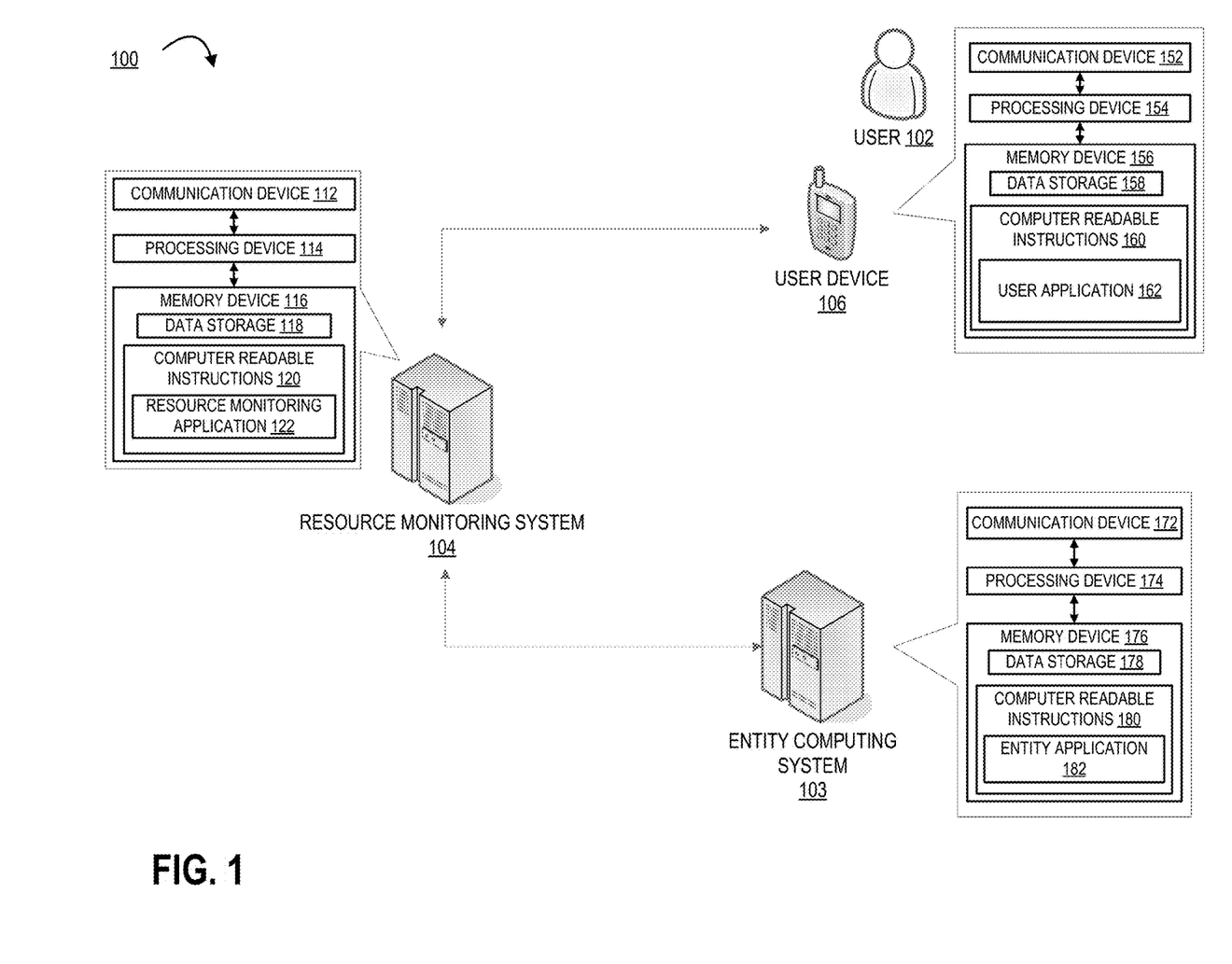
FIG. 1 illustrates an operating environment for the event-based alert system, in accordance with one embodiment of the present disclosure.

Turning now to the figures, FIG. 1 illustrates an operating environment 100 for the event-based alert system, in accordance with one embodiment of the present disclosure. In particular, FIG. 1 illustrates a resource monitoring system 104 that is operatively coupled, via a network, to a user device 106 and/or an entity computing system 103. In such a configuration, the resource monitoring system 104 may transmit information to and receive information from the user device 106 and/or the entity computing system 103. It should be understood that FIG. 1 illustrates only an exemplary embodiment of the operating environment 100, and it will be appreciated that one or more functions of the systems, devices, or servers as depicted in FIG. 1 may be combined into a single system, device, or server. For instance, the functions of the resource monitoring system 104 and the entity computing system 103 may be executed on a single computing system. Furthermore, a single system, device, or server as depicted in FIG. 1 may represent multiple systems, devices, or servers. For instance, though the user device 106 is depicted as a single unit, the user device 106 may represent multiple user devices which may be operated by multiple different users (e.g., the user 102, a third party associated with the user 102, or the like).

The network may be a system specific distributive network receiving and distributing specific network feeds and identifying specific network associated triggers. The network include one or more cellular radio towers, antennae, cell sites, base stations, telephone networks, cloud networks, radio access networks (RAN), WiFi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

The user device 106 as depicted in FIG. 1 may be a device which is owned and/or operated by a user 102. The user 102 may use the user device 106 to log onto the resource monitoring system 104 and/or the entity computing system 103 to access the resource monitoring functions as described herein. In this regard, the user device 106 may be a mobile device such as a smartphone, wearable smart device, tablet, laptop computer, or the like. In other embodiments, the user device 106 may be a stationary device such as a desktop computer, IoT device, networked terminal, or the like.

The user device 106 may comprise a communication device 152, a processing device 154, and a memory device 156. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 154 is operatively coupled to the communication device 152 and the memory device 156. The processing device 154 uses the communication device 152 to communicate with the network and other devices on the network, such as, but not limited to the entity computing system 103. The communication device 152 generally comprises a modem, antennae, WiFi or Ethernet adapter, radio transceiver, or other device for communicating with other devices on the network.

The memory device 156 may have computer-readable instructions 160 stored thereon, which in one embodiment includes the computer-readable instructions 160 of a user application 162. The user application 162 may comprise computer-executable program code which may instruct the processing device 154 to perform certain logic, data processing, and data storing functions of the application to accomplish the entity's and/or the user's objectives. For instance, the user application 162 may allow the user 102 to log onto the resource monitoring system 104 to access the resource monitoring and real-time notification functions provided therein. In this regard, the user application 162 may be an entity-provided application such as a mobile app or software suite, or the user application 162 may be a third party application such as a web browser. In some embodiments, the memory device 156 includes data storage 158 for storing data related to the system environment, but not limited to data created and/or used by the user application 162.

As further illustrated in FIG. 1, the resource monitoring system 104 may be a computing system within the entity system which provides resource monitoring and real-time notification functions across multiple channels. Accordingly, the resource monitoring system 104 may comprise a communication device 112, a processing device 114, and a memory device 116, where the processing device 114 is operatively coupled to the communication device 112 and the memory device 116. The processing device 114 uses the communication device 112 to communicate with the network and other devices on the network, such as, but not limited to the user device 106 and/or the entity computing system 103. As such, the communication device 112 generally comprises a modem, antennae, WiFi or Ethernet adapter, radio transceiver, or other device for communicating with other devices on the network.

The memory device 116 comprises computer-readable instructions 120 and data storage 118, which in one embodiment includes the computer-readable instructions 120 of a resource monitoring application 122. The resource monitoring application 122 may comprise executable code for causing the processing device 114 to perform various data aggregation and integration functions with respect to data associated with the user 102. In this regard, the resource monitoring system 104 may receive authentication credentials from the user 102, the user device 106, and/or the entity computing system 103 and authenticate/authorize users and applications based on the authentication credentials. Examples of said authentication credentials may include a username and password combination, PIN, secure token, cryptographic key, biometric data, or the like.

The operating environment 100 may further comprise an entity computing system 103. The entity computing system 103 may refer to a computing system which may be operated by a user such as an administrator or employee of the entity. The entity computing system 103 may comprise a processing device 174 operatively coupled to the communication device 172 and a memory device 176 comprising data storage 178 and computer readable instructions 180. The computer readable instructions 180 may comprise an entity application 182 which may be configured to instruct the processing device 174 to execute certain functions over the network, such as interacting with the user device 106 and/or the resource monitoring system 104. In this regard, the entity computing system 103 may be operated by a user such as an employee or administrator of the entity.

The communication device 172, and other communication devices as described herein, may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the entity computing system 103 may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user 102, may include any of a number of devices allowing the devices to receive data from a user 102, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

Figure 2:
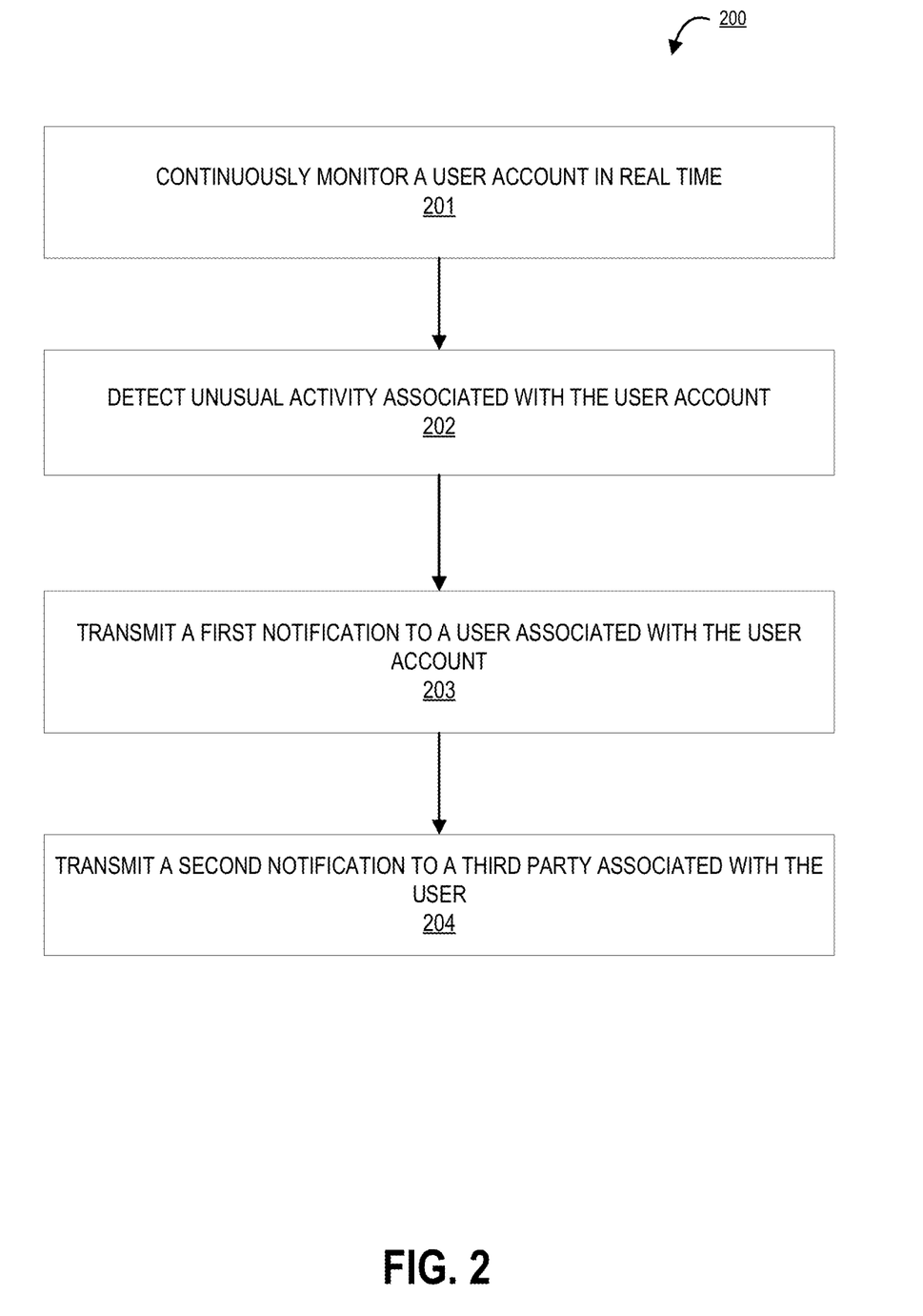
FIG. 2 illustrates a process flow for the event-based alert system, in accordance with one embodiment of the present disclosure.

FIG. 2 illustrates a process flow 200 for the event-based alert system, in accordance with one embodiment of the present disclosure. The process begins at block 201, where the system continuously monitors a user account in real time. In some embodiments, the user may be monitored because the user account has been flagged as requiring additional monitoring. For example, the user may be a user who may be more susceptible to account compromise by malicious or unauthorized parties. In such an embodiment, the system may monitor various types of data or metadata associated with the user and/or user account, such as devices used to access the user account, geographic location of the devices, unusual user behavior, resource transactions, account statuses, or the like. By continuously monitoring the user account, the system may be able to take preventative and/or corrective measures with respect to potentially unwanted or unauthorized use of the user's account and/or the resources stored therein.

The process continues to block 202, where the system detects unusual activity associated with the user account. The unusual activity may be an abnormally large transaction, an unknown sign-on device or location, an unusual type of transaction, or the like. In an exemplary embodiment, the system may detect that the flagged user has attempted to purchase multiple gift cards in a single transaction. The system may then determine that the transaction is indicative of a potentially unwanted transaction (e.g., a social engineering method) based on the status of the user and the type of transaction. In some embodiments, the system may comprise a knowledge database of known methods or patterns which may be used to identify the unusual activity.

The process continues to block 203, where the system transmits a first notification to a user associated with the user account. The first notification may comprise information about the unusual activity, such as the nature of the unusual activity, the location and/or device used, the reason for the notification, resolution steps, or the like. In some embodiments, the first notification may further comprise informational resources which may help train the user to avoid unauthorized methods used by malicious users.

The process concludes at block 204, where the system transmits a second notification to a third party associated with the user. The third party associated with the user may be an individual who has an established relationship with the user. In this regard, the third party may be a parent, child, relative, caretaker, guardian, or the like. In other embodiments, the third party may be an individual with a legal or working relationship with the user, such as an agent, contractor, account manager, or the like. In yet other embodiments, the third party may be a third party entity with a relationship with the user, such as a financial institution, insurance provider, or the like.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for resource monitoring and transmitting electronic alerts using event-based triggers, the system comprising:
   a memory device with computer-readable program code stored thereon;
   a communication device; and
   a processing device operatively coupled to the memory device and the communication device, wherein the processing device is configured to execute the computer-readable program code to:
   continuously monitor a user account in real time;
   detect a trigger event associated with the user account, wherein the trigger event comprises a resource transfer request, wherein a resource transfer type associated with the resource transfer request is associated with unauthorized activity;
   receive a distress signal from a user computing device associated with a user, wherein the distress signal indicates that the user is under influence of an unauthorized party, wherein the distress signal is a hidden PIN associated with the user;
   detect a presence of an unauthorized third party screen sharing application or a remote access application on the user computing device;

based on detecting the distress signal and the presence of the unauthorized third party screen sharing application or the remote access application on the user computing device, automatically block the resource transfer request from being processed;

implement phone porting protection for the user computing device, wherein implementing the phone porting protection comprises:

receiving, from a third party service provider server, call data associated with the user; and based on the call data associated with the user, identify whether unauthorized phone porting has occurred;

transmit a first notification to a user device associated with the user account; and transmit a second notification to a third party device associated with the user account, wherein the first notification and the second notification each indicate that an unauthorized action has been attempted.

2. The system according to claim 1, wherein continuously monitoring the user account in real time comprises at least one of monitoring devices used to access the user account and geographic location of the devices used to access the user account.

3. The system according to claim 1, wherein the trigger event further comprises an attempt to access the user account using an unknown device and unusual geographic location.

4. The system according to claim 1, wherein the first notification comprises a resource transfer amount and location at which the resource transfer was attempted.

5. A computer program product for resource monitoring and transmitting electronic alerts using event-based triggers, the computer program product comprising at least one non-transitory computer readable medium having computer-readable program code portions embodied therein, the computer-readable program code portions comprising executable code portions for:

continuously monitoring a user account in real time;

detecting a trigger event associated with the user account, wherein the trigger event comprises a resource transfer request, wherein a resource transfer type associated with the resource transfer request is associated with unauthorized activity;

receiving a distress signal from a user computing device associated with a user, wherein the distress signal indicates that the user is under influence of an unauthorized party, wherein the distress signal is a hidden PIN associated with the user;

detecting a presence of an unauthorized third party screen sharing application or a remote access application on the user computing device;

based on detecting the distress signal and the presence of the unauthorized third party screen sharing application or the remote access application on the user computing device, automatically blocking the resource transfer request from being processed;

implementing phone porting protection for the user computing device, wherein implementing the phone porting protection comprises:

receiving, from a third party service provider server, call data associated with the user; and based on the call data associated with the user, identify whether unauthorized phone porting has occurred;

transmitting a first notification to a user device associated with the user account; and transmitting a second notification to a third party device associated with the user account, wherein the first notification and the second notification each indicate that an unauthorized action has been attempted.

6. The computer program product of claim 5, wherein continuously monitoring the user account in real time comprises at least one of monitoring devices used to access the user account and geographic location of the devices used to access the user account.

7. The computer program product of claim 5, wherein the trigger event further comprises an attempt to access the user account using an unknown device and unusual geographic location.

8. The computer program product of claim 5, wherein the first notification comprises a resource transfer amount and location at which the resource transfer was attempted.

9. A computer-implemented method for resource monitoring and transmitting electronic alerts using event-based triggers, the computer-implemented method comprising:

continuously monitoring a user account in real time;

detecting a trigger event associated with the user account, wherein the trigger event comprises a resource transfer request, wherein a resource transfer type associated with the resource transfer request is associated with unauthorized activity;

receiving a distress signal from a user computing device associated with a user, wherein the distress signal indicates that the user is under influence of an unauthorized party, wherein the distress signal is a hidden PIN associated with the user;

detecting a presence of an unauthorized third party screen sharing application or a remote access application on the user computing device;

based on detecting the distress signal and the presence of the unauthorized third party screen sharing application or the remote access application on the user computing device, automatically blocking the resource transfer request from being processed;

implementing phone porting protection for the user computing device, wherein implementing the phone porting protection comprises:

receiving, from a third party service provider server, call data associated with the user; and based on the call data associated with the user, identify whether unauthorized phone porting has occurred;

transmitting a first notification to a user device associated with the user account; and transmitting a second notification to a third party device associated with the user account, wherein the first notification and the second notification each indicate that an unauthorized action has been attempted.

10. The computer-implemented method of claim 9, wherein continuously monitoring the user account in real time comprises at least one of monitoring devices used to access the user account and geographic location of the devices used to access the user account.

11. The computer-implemented method of claim 9, wherein the trigger event further comprises an attempt to access the user account using an unknown device and unusual geographic location.

12. The computer-implemented method of claim 9, wherein the first notification comprises a resource transfer amount and location at which the resource transfer was attempted.

* * * * *